(12) United States Patent
Shiau et al.

(10) Patent No.: US 8,310,624 B2
(45) Date of Patent: Nov. 13, 2012

(54) BACKLIGHT MODULE AND LIQUID CRYSTAL DISPLAY APPARATUS

(75) Inventors: Tzeng-Ke Shiau, Hsin-Chu (TW); Chao-Hung Weng, Hsin-Chu (TW); Ching-Shiang Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 340 days.

(21) Appl. No.: 12/795,622

(22) Filed: Jun. 7, 2010

(65) Prior Publication Data
US 2011/0069249 A1 Mar. 24, 2011

(30) Foreign Application Priority Data
Sep. 21, 2009 (TW) .............................. 98131782 A

(51) Int. Cl.
*G02F 1/1335* (2006.01)
(52) U.S. Cl. .............. 349/64; 349/62; 359/599
(58) Field of Classification Search ...................... 349/64
See application file for complete search history.

(56) References Cited

U.S. PATENT DOCUMENTS

| | | | |
|---|---|---|---|
| 6,633,351 B2 | 10/2003 | Hira et al. | |
| 6,909,486 B2 | 6/2005 | Wang et al. | |
| 6,961,108 B2 | 11/2005 | Wang et al. | |
| 6,967,779 B2 | 11/2005 | Fadel et al. | |
| 7,374,328 B2 | 5/2008 | Kuroda et al. | |
| 7,889,310 B2 * | 2/2011 | Yoshikawa et al. | 349/187 |
| 2007/0002452 A1 | 1/2007 | Munro | |
| 2009/0257000 A1 * | 10/2009 | Ogasawara et al. | 349/64 |

FOREIGN PATENT DOCUMENTS

| TW | 561278 | 11/2003 |
|---|---|---|
| TW | 200808478 | 2/2008 |

* cited by examiner

*Primary Examiner* — Richard Kim
(74) *Attorney, Agent, or Firm* — Jianq Chyun IP Office

(57) ABSTRACT

A backlight module includes a lighting unit and a brightness enhancement sheet. The brightness enhancement sheet is disposed beside the lighting unit. The brightness enhancement sheet includes a light-transmissive substrate, a plurality of lenses, a reflective layer, and a diffusion layer. The light-transmissive substrate has a first surface and a second surface opposite to the first surface. The first surface is located between the second surface and the lighting unit. The lenses are disposed on the first surface. The reflective layer is disposed on the second surface. The reflective layer has a plurality of light-transmissive openings respectively located on the optical axes of the lenses. The diffusion layer is disposed on the reflective layer and covers the light-transmissive openings. The reflective layer is disposed between the diffusion layer and the second surface. A liquid crystal display apparatus is also provided.

20 Claims, 7 Drawing Sheets

BACKLIGHT MODULE AND LIQUID CRYSTAL DISPLAY APPARATUS

CROSS-REFERENCE TO RELATED APPLICATION

This application claims the priority benefit of Taiwan application serial no. 98131782, filed on Sep. 21, 2009. The entirety of the above-mentioned patent application is hereby incorporated by reference herein and made a part of this specification.

BACKGROUND OF THE INVENTION

1. Field of the Invention

The invention relates to a display apparatus and a light source, and more particularly, to a liquid crystal display apparatus and a backlight module.

2. Description of Related Art

With the advancement of technology, a flat display becomes a mainstream of the display device to replace a conventional cathode ray tube (CRT) having a big volume and heavy weight. In flat displays, liquid crystal display (LCD) is popular with people. The LCD includes a liquid crystal panel and a backlight module but is unable to emit light spontaneously. The liquid crystal panel is used to determine a light transmittance. Thereby, the backlight module is disposed on the backside of the liquid crystal panel to serve a surface light source for the liquid crystal panel. A display quality of the LCD is influenced by an optics quality of the surface light source greatly. For example, in order to display frames normally and decrease distortions, a uniform surface light source is necessary. In addition, in order to increase a brightness of the frames, a light emitting angle range of the surface light source is limited to avoid light loss.

In a conventional transmissive side incident type backlight module, a lower diffusion sheet, two prism sheets and an upper diffusion sheet are disposed on the light guide plate sequentially from bottom to up, wherein prism rods of one prism sheet are perpendicular to prism rods of the other prism sheet. The prism sheet is used to decrease light emitting angle range, the upper diffusion sheet and lower diffusion sheet are used to uniform the light and avoid moire being generated by a contour of the prism rod and the liquid crystal panel. However, such a method that four optical films are disposed in the light guide plate increases the cost of the backlight module, and too many optical films also obstruct fabrication and it is hard to decrease a thickness of the backlight module.

Besides, a transmissive LCD is usually used in an indoor environment. If the transmissive LCD is used in an outdoor environment, an ambient light is too strong to identify the frames displayed by the transmissive LCD. Furthermore, in the outdoor environment, users may easier see the frames displayed by a reflective LCD. For the reflective LCD, a back light source is unnecessary, so that the reflective LCD has a property of low power consumption.

However, when a strong light strikes a surface of the reflective LCD, the reflective light is also too strong to identify the frames. Presently, although a transflective type LCD is developed to adapt to the indoor environment and the outdoor environment, the problem that the users may not easily see the frames caused by the strong ambient light and the strong reflective light is not over come.

On the other hand, U.S. Pat. No. 7,374,328 provides an optical film including a diffusion layer, a reflective layer, and a lens layer. The reflective layer has openings corresponding to the lens layer, the light emitted by the light source sequentially passes through the diffusion layer, the opening, and the lens layer. Moreover, each of the Taiwan patent application publication No. 200808478, U.S. Pat. No. 6,633,351, and U.S. Pat. No. 6,967,779 provides an optical film and manufacture method of the optical film. Taiwan Patent No. 561278 and U.S. patent application publication 20070002452 both disclose an optical film, and U.S. Pat. Nos. 6,961,108 and 6,909,486 disclose a transflective type optical film.

SUMMARY OF THE INVENTION

The invention is directed to a backlight module, wherein the assembly of the backlight module is facilitated, the cost of the backlight module is decreased, and the optical efficiency of the backlight module is increased.

The invention is directed to a liquid crystal display apparatus, wherein the assembly of the liquid crystal display apparatus is facilitated, the cost of the liquid crystal display apparatus is decreased, and the optical efficiency of the liquid crystal display apparatus is increased, and the liquid crystal display apparatus uses the ambient light efficiently.

Other advantages of the invention can be further indicated by the disclosures of the invention.

An embodiment of the invention provides a backlight module including a lighting unit and a brightness enhancement sheet. The lighting unit is capable of providing an illumination beam. The brightness enhancement sheet is disposed at one side of the lighting unit and in a transmission path of the illumination beam. The brightness enhancement sheet includes a light-transmissive substrate, a plurality of lenses, a reflective layer, and a diffusion layer. The light-transmissive substrate has a first surface and a second surface opposite to the first surface, wherein the first surface is located between the second surface and the lighting unit. The lenses are disposed on the first surface. The reflective layer is disposed on the second surface. The reflective layer has a plurality of light-transmissive openings. The light-transmissive openings are respectively located on the optical axes of the lenses. The diffusion layer is disposed on the reflective layer and covers the light-transmissive openings. The reflective layer is disposed between the diffusion layer and the second surface.

Another embodiment of the invention provides a liquid crystal display apparatus including the above backlight module and a liquid crystal panel. The brightness enhancement sheet is disposed between the liquid crystal panel and the lighting unit, and the second surface is located between the first surface and the liquid crystal panel.

In the embodiments of the invention, the lenses are located between the reflective layer and the lighting unit, and the diffusion layer is located at one side of the reflective layer facing away from the lighting unit. Thereby, the illumination beam emitted by the back light unit is converged by the lens, and then the illumination beam is diffused by the diffusion layer, so that the backlight module may provide a uniform surface light source, and then the LCD panel may provide a high quality frame. In addition, a light emitting angle of the reflected ambient light is increased, which is useful that the reflected ambient light served as another good back light source of the liquid crystal panel due to the ambient light being diffused twice by the diffusion layer before and after being reflected by the reflective layer.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EXEMPLARY EMBODIMENTS

Figure 1A:
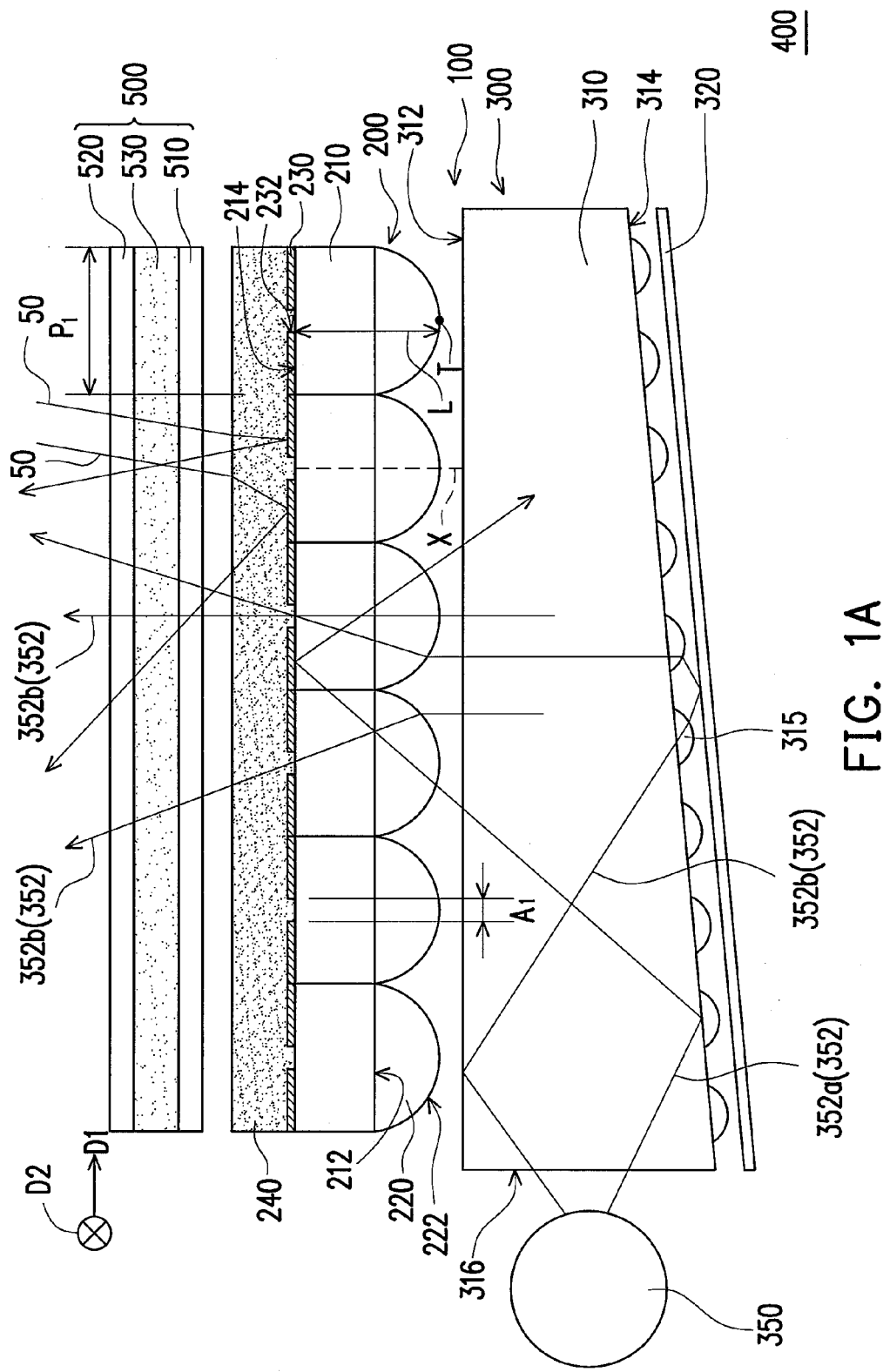
FIG. 1A and FIG. 1B are cross-sectional diagrams of a liquid crystal display apparatus in two different directions perpendicular to each other according to an embodiment of the invention.
Figure 1B:
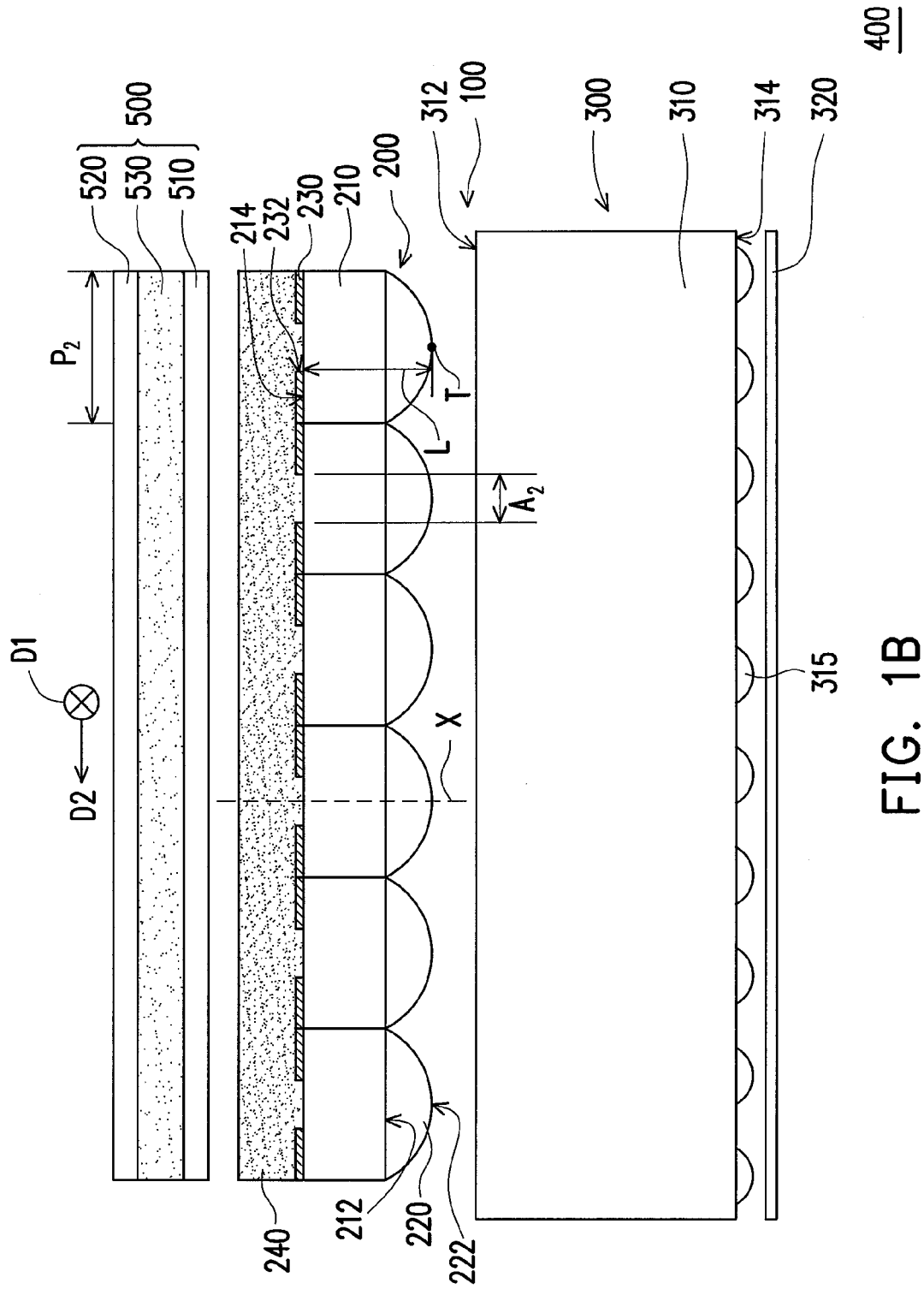

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to the FIG. 1A, FIG. 1B, FIG. 2A and FIG. 2B, a liquid crystal display apparatus 400 of the embodiment includes a backlight module 100 and a liquid crystal panel 500. The backlight module 100 includes a lighting unit 300 and a brightness enhancement sheet 200. In the embodiment, the lighting unit 300 includes a light emitting device 350. The light emitting device 350 is capable of emitting an illumination beam 352. In the embodiment, the light emitting device 350 is, for example, a cold cathode fluorescent lamp (CCFL). However, in another embodiment, the lighting unit may has a plurality of light emitting devices, for example, light emitting diodes (LEDs) arranged in a line.

In the embodiment, the lighting unit 300 further includes a light guide plate 310 having a surface 312, a surface 314 opposite to the surface 312, and a light incident surface 316 connecting the surface 312 and the surface 314. The light emitting device 350 may be disposed beside the light incident surface 316. More particularly, the illumination beam 352 emitted by the light emitting device 350 may enter the light guide plate 310 through the light incident surface 316, and the illumination beam 352 may be totally reflected by the surface 312 and the surface 314, so that the illumination beam 352 is confined in the light guide plate 310. However, microstructures 315 on the surface 314 of the light guide plate 310 may destroy the total internal reflection. For example, a part of the illumination beam 352a may be reflected by the microstructure 315 to the surface 312, and then transmit through the surface 312. Another part of the illumination beam 352b may pass through the microstructures 315 and transmit to a reflective sheet 320 disposed at one side of the surface 314. The reflective sheet 320 may reflect the illumination beam 352, such that the illumination beam 352 may pass through the surface 314 and the surface 312 sequentially. After the illumination beam 352 passes through the surface 312, a surface light source may be formed. Thereby, the lighting unit 300 may provide the illumination beam 352 emitted by the surface 312.

The brightness enhancement sheet 200 is disposed at one side of the lighting unit 300 and in a transmission path of the illumination beam 352. The brightness enhancement sheet 200 includes a light-transmissive substrate 210, a plurality of lenses 220, a reflective layer 230, and a diffusion layer 240. The light-transmissive substrate 210 has a first surface 212 and a second surface 214 opposite to the first surface 212, wherein the first surface 212 is located between the second surface 214 and the lighting unit 300. The lenses 220 are disposed on the first surface 212. In the embodiment, each of the lenses 220 has a curved convex surface 222 facing away from light-transmissive substrate 210. A curvature radius of curved convex surface 222 in a first direction D1 parallel to the first surface 212 is $R_1$, a curvature radius of the curved convex surface 222 in a second direction D2 parallel to the first surface 212 is $R_2$. In the embodiment, the first direction D1 is substantially perpendicular to the second direction D2, and $R_1 \neq R_2$. However, in another embodiment, the curvature radii may satisfy $R_1 = R_2$. Further, in the embodiment, the curved convex surface 222 may be a smooth curved surface, or the curved convex surface 222 may be composed of a plurality of little straight line segments or bending line segments.

The reflective layer 230 is disposed on the second surface 214, wherein the reflective layer 230 has a plurality of light-transmissive openings 232, and the light-transmissive openings 232 are located on optical axes X of the lenses 220, respectively. The reflective layer 230 is, for example, a metal layer or a non-metal layer having a reflection function, and a surface of the reflective layer 230 may be a smooth surface, a rough surface or a surface having diffusion particles. In the embodiment, a distance from an apex T of the curved convex surface 222 of the lens 220 to the corresponding light-transmissive opening 232 is L, a refractive index of the lenses 220 is n, and the brightness enhancement sheet 200 satisfies $L<nR_1/(n-1)$ and $L<nR_2/(n-1)$. However, in the embodiment that $R_1=R_2$, the brightness enhancement sheet may satisfy $L<nR_1/(n-1)$.

The diffusion layer 240 is disposed on the reflective layer 230 and covers the light-transmissive openings 232, wherein the reflective layer 230 is disposed between the diffusion layer 240 and the second surface 214. In the embodiment, the diffusion layer 240 may be filled with the light-transmissive openings 232. Moreover, in the embodiment, the diffusion layer 240 may has diffusion particles, the diffusion particles may be doped in the diffusion layer, or located at the surface of the diffusion layer (for example, the diffusion particles are located at a surface of the diffusion layer 240 facing away from the light-transmissive substrate 210), or located at both the surface and the inside of the diffusion layer. The diffusion particles have a light scattering function. A refractive index of the diffusion particles may be equal to or not equal to a refractive index of substrates of the diffusion layer 240.

The liquid crystal panel 500 is disposed on the backlight module 100. More particularly, the brightness enhancement sheet 200 is disposed between the liquid crystal panel 500 and the lighting unit 300, and the second surface 214 is located between the first surface 212 and the liquid crystal panel 500. The liquid crystal panel 500 includes an active device array substrate 510, an opposite substrate 520, and a liquid crystal layer 530 disposed between the active device array substrate 510 and the opposite substrate 520. In the embodiment, the active device array substrate 510 is, for example, a thin-film transistor (TFT) array substrate, the opposite substrate 520 is, for example, a color filter substrate, and the liquid crystal layer 530 includes liquid crystal molecules.

In the liquid crystal display apparatus 400 of the embodiment, when a part of the illumination beam 352$b$ from the surface 312, which is perpendicular to first surface 212, passes through the lenses 220, the illumination beam 352$b$ is converged by the lenses 200 and then passes through the light-transmissive opening 232. In addition, after the illumination beam 352$b$ passes through the light-transmissive opening 232, the illumination beam 352$b$ is diffused by the diffusion layer 240 and a light emitting angle of the illumination beam 352$b$ increases thereby. Further, a part of the illumination beam 352$a$ from the surface 312, which is inclined with respect to the first surface 212, is reflected by the reflective layer 230 to the lighting unit 300 for reuse. More particularly, the part of illumination beam 352$a$ reflected by the reflective layer 230 to the lighting unit 300 is reflected repeatedly between the reflective layer 230 and the reflective sheet 320 until passing through the light-transmissive openings 232.

Compared to the conventional backlight module using a plurality of optical films to increase the light and uniform the light, the backlight module 100 of the embodiment uses one brightness enhancement sheet 200 to have a similar advantage, such that the assembly may be facilitated, the cost may be decreased, and the thickness of the backlight module 100 may be decreased. Furthermore, the illumination beam 352 not passing through the pass opening 232 is reflected by the reflective layer 230 to the lighting unit 310 to reuse, such that a high optical efficiency is achieved when the cost is lower, and the reflective dual brightness enhancement film (DBEF) of the conventional transflective type LCD may be unnecessary.

On the other hand, after a part of the external ambient light 50 passes through the liquid crystal panel 500, the ambient light 50 is diffused by the diffusion layer 240 to have a wide incident angle. Then, the ambient light 50 is reflected by the reflective layer 230, and diffused by the diffusion layer 240 again to have a wider emitting angle. Thereby, the ambient light 50 may be uniformly scattered to different viewing angles. The uniform scattered ambient light 50 may be served as another back light source of the liquid crystal panel 500. After the ambient light 50 pass through the liquid crystal panel 500, the ambient light 50 may be observed by the users and the brightness of image frames observed by the users increases thereby. In addition, even though the intensity of the ambient light 50 is very high, the ambient light 50 is diffused twice by the diffusion layer 240 so as to disperse the intensity of the ambient light 50 such that under the strong ambient light 50, the images displayed by the liquid crystal display apparatus 400 may easily be identified by the users.

Moreover, in the brightness enhancement sheet 200 of the embodiment, $R_1 \neq R_2$ may be applied to backlight modules having different requirements for light emitting angle ranges in different directions. The $R_1$ and $R_2$ may be adjusted appropriately, so that the backlight module 100 having the brightness enhancement sheet 200 may be applied to a display in the different type of electronic devices, for example, a liquid crystal display apparatus of a mobile phone, a notebook computer, a monitor, a television or other similar electronic devices.

In the embodiment, widths of the light-transmissive openings 232 in the first direction D1 are not equal to widths of the light-transmissive openings 232 in the second direction D2. Further, the width of the light-transmissive opening 232 in the first direction D1 is $A_1$, the width of the light-transmissive opening 232 in the second direction is $A_2$, a width of the curved convex surface 222 corresponding to the light-transmissive opening 232 in the first direction is $P_1$, a width of the curved convex surface 222 corresponding to the light-transmissive opening 232 in the second direction D2 is $P_2$, and the brightness enhancement sheet 200 satisfies $0.1<A_1/P_1<0.9$ and $0.1<A_2/P_2<0.9$. Therefore, a light emitting angle range in the first direction D1 and a light emitting angle range in the second direction. D2 may be more various, such that applications of the brightness enhancement sheet 200 and the backlight module 100 are wider. However, in other embodiment, it may be adopted that $A_1=A_2$ and $P_1=P_2$, or it may be adopted that $A_1=A_2$ or $P_1=P_2$.

In the embodiment, a laser drill technology may be used to form the light-transmissive openings 232 of the reflective layer 230. More particularly, before the laser drill process, the reflective layer 230 is distributed overall the second surface 214. Then, a parallel laser emits from the bottom of the brightness enhancement sheet 200 in the FIG. 1A to the lens 220, in other word, the parallel laser travels to the lens 220 along a direction perpendicular to the first direction D1 and the second direction D2. A location and a size of a spot formed by the laser on the reflective layer 230 is approximate to a location and a size of the light-transmissive opening 232 after the laser is converged by the lens 220. Thereby, the size of the light-transmissive opening 232, drilled on the reflective layer 230 by the laser, approximate to the spot. When the brightness enhancement sheet 200 satisfies $L<nR_1/(n-1)$ and $L<nR_2/(n-1)$, the light-transmissive opening 232, drilled by the laser, more approximate to the spot. Therefore, a single drill process using the parallel laser is needed to drill light-transmissive openings 232 having an expected location and an expected size. Therefore, the design of the brightness enhancement sheet 200 facilitates the fabrication so as to further reduce the cost of the backlight module 100. Furthermore, in the embodiment, when the brightness enhancement sheet satisfies L<nR$_1$/(n−1)及 L<nR$_2$/(n−1), the illumination beam 352 passing through the brightness enhancement sheet 200 may be more uniform and enhanced, and then the backlight module 100 of the embodiment may provide a more uniform and brighter surface light source.

Figure 2A:
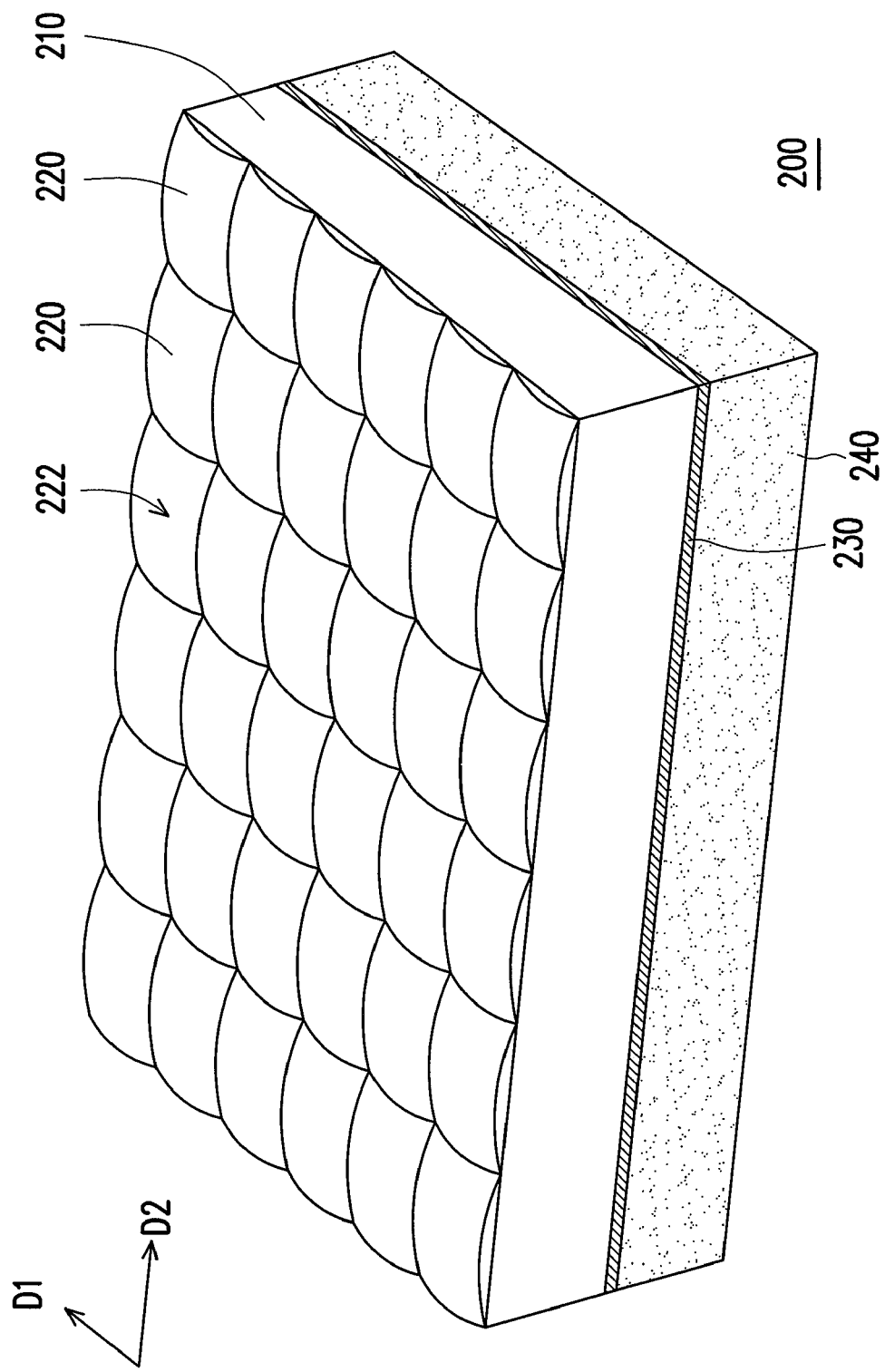
FIG. 2A is a perspective view of the brightness enhancement sheet shown in FIG. 1A.
Figure 2B:
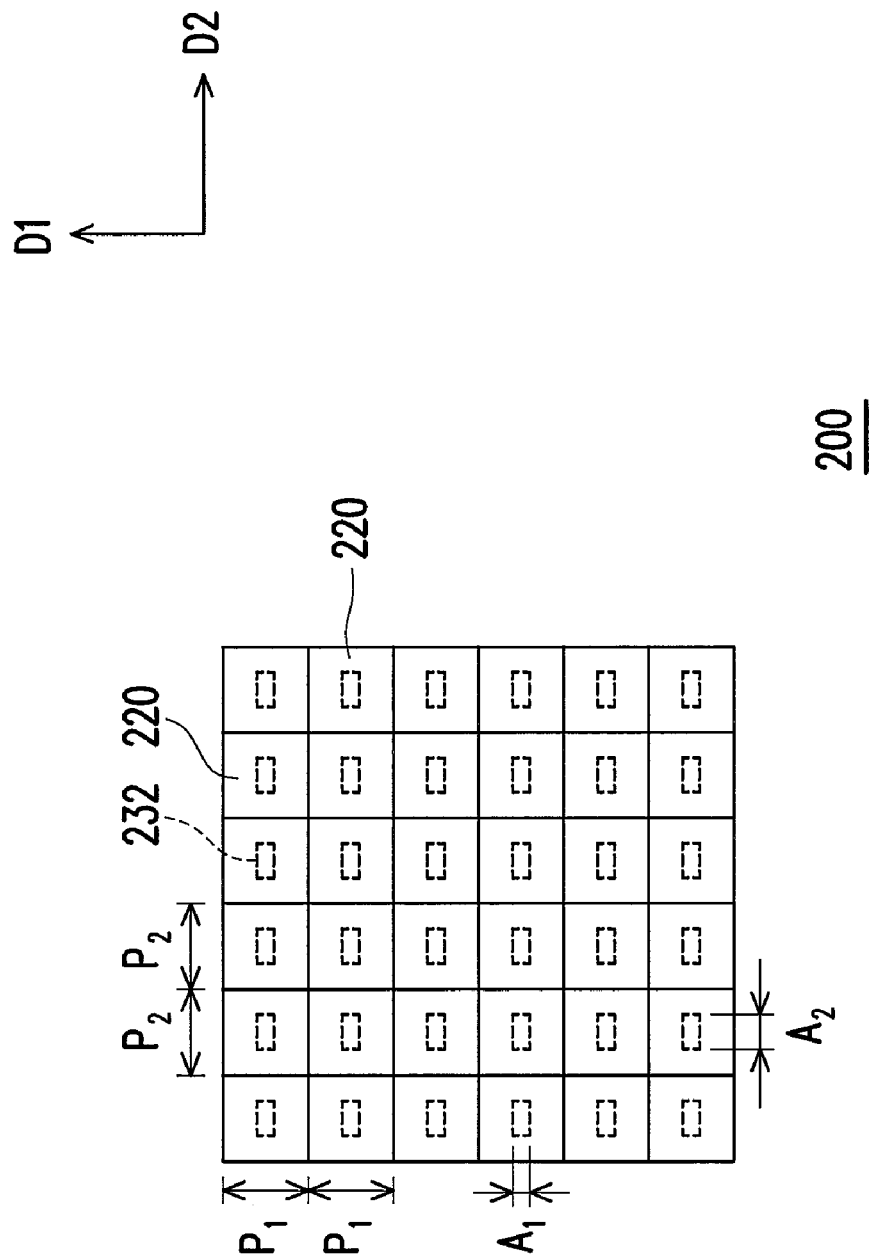
FIG. 2B is a bottom view of the brightness enhancement sheet shown in FIG. 1A.
Figure 3B:
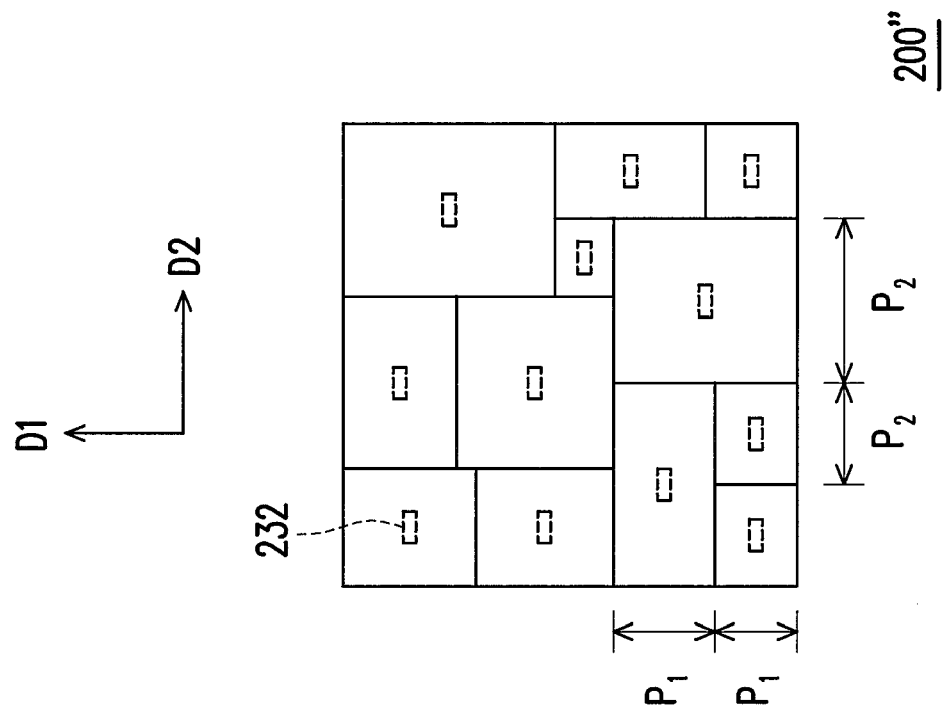
FIG. 3B is a bottom view of the brightness enhancement sheet according to another embodiment of the invention.
Figure 3A:
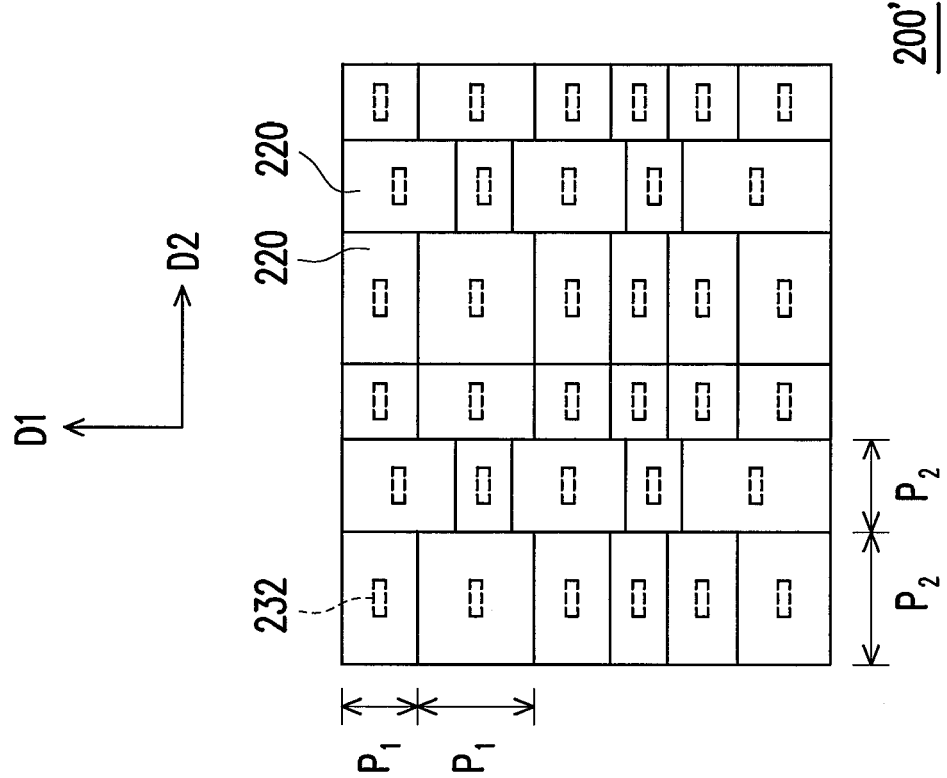
FIG. 3A is a bottom view of a brightness enhancement sheet according to another embodiment of the invention.

Referring to the FIG. 3A, a brightness enhancement sheet 200' of the embodiment is similar to the brightness enhancement sheet 200 of the FIG. 2B, the difference between the both is described below. In the brightness enhancement sheet 200' of the embodiment, widths P$_1$ of at least parts of the lenses 220 in the first direction are not equal to each other. A ratio of a maximum value among of the widths P$_1$ of the lenses in the first direction D1 to a minimum value among of the width P$_1$ of the lenses in the first direction D1 ranges from 1 to 4. In addition, in the embodiment, widths P$_2$ of at least parts of the lenses 220 in the second direction D2 may be not equal to each other. A ratio of a maximum value among of the width P$_2$ of the lenses in the second direction D2 to a minimum value among of the width P$_2$ of the lenses in the second direction D2 ranges from 1 to 4. The sizes and locations of the lenses 220 are designed irregularly, so that the moire results from the brightness enhancement sheet 200' and the liquid crystal panel disposed on the brightness enhancement sheet 200' may be reduced.

Referring to the FIG. 3A and the FIG. 3B, differences between a brightness enhancement sheet 200" of the embodiment (shown as the FIG. 3B) and the brightness enhancement sheet 200' (shown as the FIG. 3A) are described below. The widths P$_2$ of the lenses 220 disposed on the same line alone a direction (for example, the first direction D1) in the brightness enhancement sheet 200' are substantially equal to each other, and at least parts of the widths P$_1$ of the lenses 220 disposed on the same line alone another direction (for example, the second direction D2) are substantially not equal to each other. However, at least parts of the widths P$_1$ or P$_2$ of the lenses 220 disposed on the same line alone the first direction D1 or the second direction D2 in the brightness enhancement sheet 200" are substantially not equal to each other. The brightness enhancement sheet 200" has a higher degree of irregularity, and the manufacture and design of the brightness enhancement sheet 200' is easier.

Figure 4:
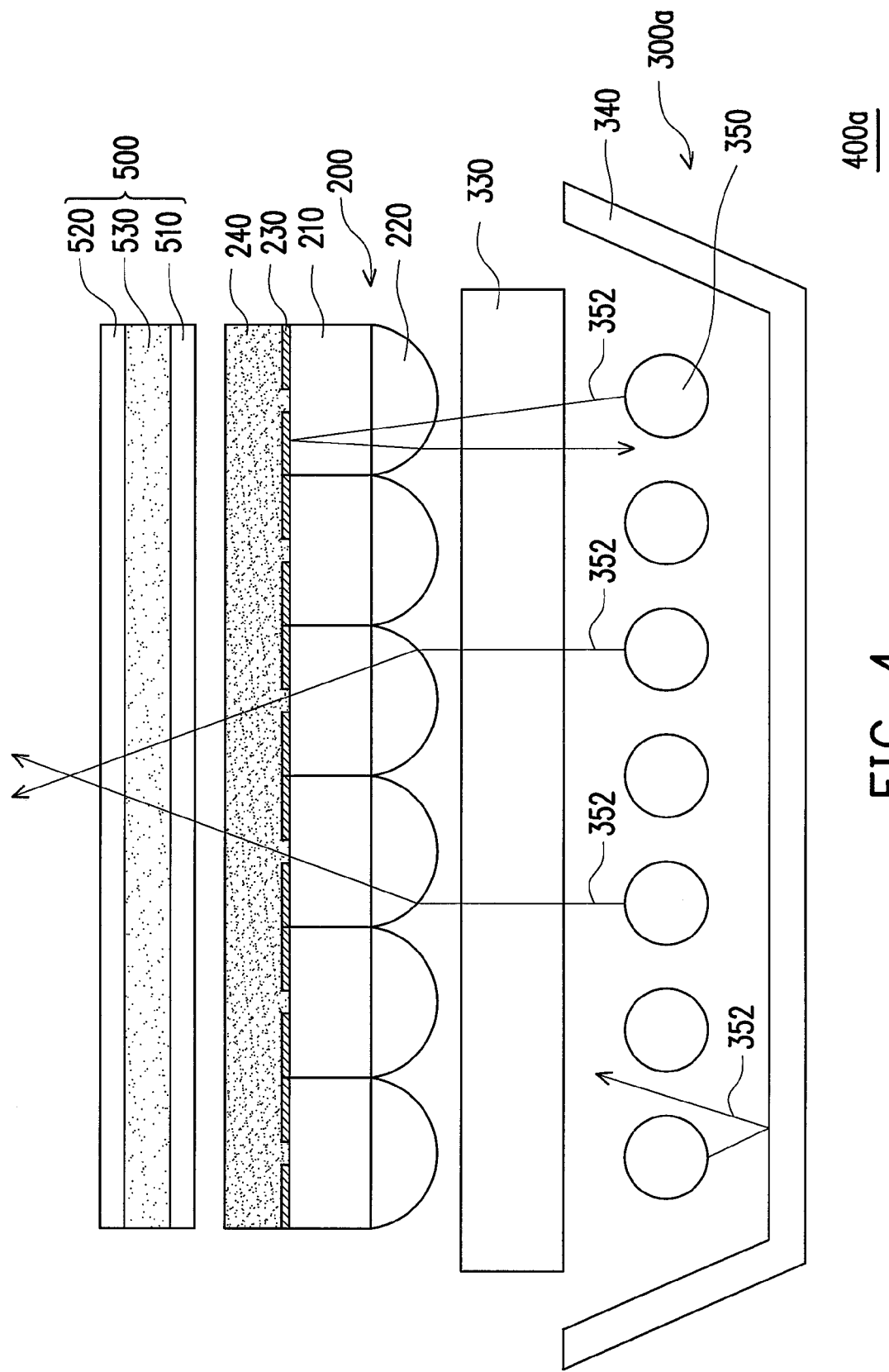
FIG. 4 is a cross-sectional diagram of a backlight module according to another embodiment of the invention.

Referring to the FIG. 4, a liquid crystal display apparatus 400a of the embodiment is partially similar to the liquid crystal display apparatus 400 of the FIG. 1A, and the difference between the both is described below. The backlight module 100 of the FIG. 1A is a side-type backlight module including the light guide plate 310, and a direct-type backlight module is used in the embodiment. More particularly, a lighting unit 300a includes a diffusion plate 330, wherein the diffusion plate 330 being disposed between the brightness enhancement sheet 200 and a plurality of light emitting devices 350, which is one feature of the direct-type backlight module. An illumination beam 352 emitted by the light emitting devices 350 passes through the diffusion plate 330, diffused by the diffusion plate 330, and then travels to the brightness enhancement sheet 200. In the embodiment, the lighting unit 300a further includes a light container 340, and the light emitting devices 350 are disposed in the light container 340. An internal wall of the light container 340 has a reflection function capable of reflecting the illumination beam 352 from the light emitting devices 350 to the diffusion plate 330.

Figure 5:
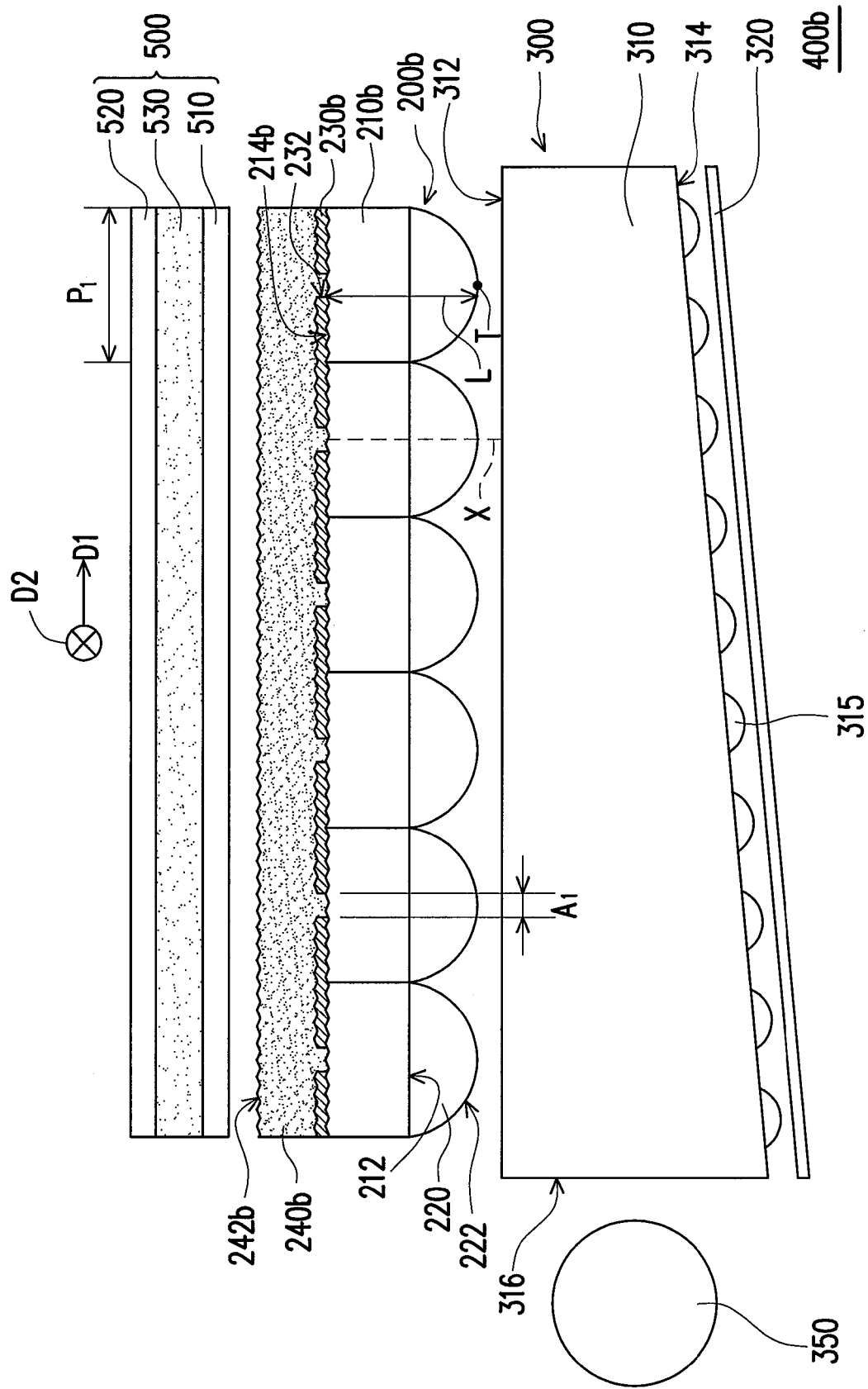
FIG. 5 is a cross-sectional diagram of a backlight module according to another embodiment of the invention.

Referring to FIG. 5, a liquid crystal display apparatus 400b of the FIG. 5 is similar to the liquid crystal display apparatus 400 (as shown as FIG. 1A), and the difference of the both is described below. In the embodiment, the second surface 214b of the light-transmissive substrate 210b of the brightness enhancement sheet 200b is a rough surface, and the surface of the reflective layer 230b disposed on the second surface 214b is also rough. Further, in the embodiment, the surface 242b of the diffusion layer 240b facing away from the light-transmissive substrate 210b is a rough surface too. All of the rough surfaces located at the above locations may enhance the diffusion effect of a light. In other embodiments, the rough surface may be replaced by a surface having other surface microstructures, and the surface microstructures are, for example, protruding spots, recessing spots, protruding strips, recessing strips, structures having various kinds of geometry shapes or structures having other irregular shapes. Moreover, in other embodiments, one to several of the second surface 214b, the surface of the reflective layer 230b and the surface 242b of the diffusion layer 240b is selected to be a rough surface or a surface having microstructures, and all of the above surfaces being rough surfaces or having microstructure at the same time is not necessary.

In summary, the embodiment or the embodiments of the invention may have at least one of the following advantages. In the embodiments of the invention, the lenses are located between the reflective layer and the lighting unit, and the diffusion layer is located at one side of the reflective layer facing away from the lighting unit, so that the illumination beam emitted by the backlight module is converged by the lenses and then diffused by the diffusion layer. As a result, the backlight module may provide more uniform surface light source to increase the quality of frames displayed by the LCD panel. In addition, a light emitting angle of the reflected ambient light is increased to help the reflected ambient light served as another good back light source of the liquid crystal panel for the ambient light is diffused twice by the diffusion layer before and after being reflected by the reflective layer.

Bedsides, in the embodiments of the invention, R$_1$≠R$_2$ may be applied to the backlight modules having different requirements for the light emitting angle ranges in different directions. The R$_1$ and R$_2$ may be adjusted appropriately, so that the backlight module having the brightness enhancement sheet may be applied to a display in different types of electronic devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising:
a lighting unit capable of providing an illumination beam; and
a brightness enhancement sheet, disposed at one side of the lighting unit and in a transmission path of the illumination beam, wherein the brightness enhancement sheet comprises:
a light-transmissive substrate, having a first surface and a second surface opposite to the first surface, wherein the first surface is located between the second surface and the lighting unit;
a plurality of lenses, disposed on the first surface;
a reflective layer, disposed on the second surface, wherein the reflective layer has a plurality of light-transmissive openings, the light-transmissive openings are respectively located on the optical axes of the lenses; and
a diffusion layer, disposed on the reflective layer and covering the light-transmissive openings, wherein the reflective layer is disposed between the diffusion layer and the second surface.

2. The backlight module as claimed in claim 1, wherein each of the lenses has a curved convex surface facing away from the light-transmissive substrate, a curvature radius of the curved convex surface in a first direction parallel to the first surface is $R_1$, a curvature radius of the curved convex surface in a second direction parallel to the first surface is $R_2$, the first direction is substantially perpendicular to the second direction, a distance from an apex of the curved convex surface of the lens to the corresponding light-transmissive opening is L, a refractive index of the lenses is n, $R_1=R_2$, and $L<n R_1/(n-1)$.

3. The backlight module as claimed in claim 1, wherein each of the lenses has a curved convex surface facing away from the light-transmissive substrate, a curvature radius of the curved convex surface in a first direction parallel to the first surface is $R_1$, a curvature radius of the curved convex surface in a second direction parallel to the first surface is $R_2$, the first direction is substantially perpendicular to the second direction, a distance from an apex of the curved convex surface of the lens to the corresponding light-transmissive opening is L, a refractive index of the lenses is n, $R_1 \neq R_2$, $L<nR_1/(n-1)$ and $L<nR_2/(n-1)$.

4. The backlight module as claimed in claim 3, wherein widths of light-transmissive openings in the first direction are not equal to widths of light-transmissive openings in the second direction.

5. The backlight module as claimed in claim 3, wherein a width of the light-transmissive opening in the first direction is $A_1$, a width of light-transmissive opening in the second direction is $A_2$, a width of the curved convex surface corresponding to the light-transmissive opening in the first direction is $P_1$, a width of the curved convex surface corresponding to the light-transmissive opening in the second direction is $P_2$, and the brightness enhancement sheet is conformed to $0.1<A_1/P_1<0.9$ and $0.1<A_2/P_2<0.9$.

6. The backlight module as claimed in claim 3, wherein widths of at least parts of the lenses in the first direction are not equal to each other.

7. The backlight module as claimed in claim 6, wherein a ratio of a maximum value among of the widths of the lenses in the first direction to a minimum value among of the widths of the lenses in the first direction is between 1 and 4.

8. The backlight module as claimed in claim 6, wherein widths of at least parts of the lenses in the second direction are not equal to each other.

9. The backlight module as claimed in claim 8, wherein a ratio of a maximum value among of the widths of the lenses in the second direction to a minimum value among of the widths of the lenses in the second direction is between 1 and 4.

10. The backlight module as claimed in claim 1, wherein at least one of the second surface, a surface of the reflective layer and a surface of the diffusion layer facing away from the light-transmissive substrate is a rough surface.

11. A liquid crystal display apparatus, comprising:
a lighting unit, for providing an illumination beam;
a brightness enhancement sheet, disposed at one side of the lighting unit and in a transmission path of the illumination beam, wherein the brightness enhancement sheet comprises:
a light-transmissive substrate, having a first surface and a second surface opposite to the first surface, wherein the first surface is located between the second surface and the lighting unit;
a plurality of lenses, disposed on the first surface;
a reflective layer, disposed on the second surface, wherein the reflective layer has a plurality of light-transmissive openings, and the light-transmissive openings are respectively located on the optical axes of the lenses; and
a diffusion layer, disposed on the reflective layer and covering the light-transmissive openings, wherein the reflective layer is disposed between the diffusion layer and the second surface; and
a liquid crystal panel, wherein the brightness enhancement sheet is disposed between the liquid crystal panel and the lighting unit, and the second surface is located between the first surface and the liquid crystal panel.

12. The liquid crystal display apparatus as claimed in claim 11, wherein each of the lenses has a curved convex surface facing away from the light-transmissive substrate, a curvature radius of the curved convex surface in a first direction parallel to the first surface is $R_1$, a curvature radius of the curved convex surface in a second direction parallel to the first surface is $R_2$, the first direction is substantially perpendicular to the second direction, a distance from an apex of the curved convex surface of the lens to the corresponding light-transmissive opening is L, a refractive index of the lenses is n, $R_1=R_2$, and $L<nR_1/(n-1)$.

13. The liquid crystal display apparatus as claimed in claim 11, wherein each of the lenses has a curved convex surface facing away from the light-transmissive substrate, a curvature radius of the curved convex surface in a first direction parallel to the first surface is $R_1$, a curvature radius of the curved convex surface in a second direction parallel to the first surface is $R_2$, the first direction is substantially perpendicular to the second direction, a distance from an apex of the curved convex surface of the lens to the corresponding light-transmissive opening is L, a refractive index of the lenses is n, $R_1 \neq R_2$, $L<nR_1/(n-1)$, and $L<nR_2/(n-1)$.

14. The liquid crystal display apparatus as claimed in claim 13, wherein widths of light-transmissive openings in the first direction are not equal to widths of light-transmissive openings in the second direction.

15. The liquid crystal display apparatus as claimed in claim 13, wherein a width of the light-transmissive opening in the first direction is $A_1$, a width of light-transmissive opening in the second direction is $A_2$, a width of the curved convex surface corresponding to the light-transmissive opening in the first direction is $P_1$, a width of the curved convex surface corresponding to the light-transmissive opening in the second direction is $P_2$, the brightness enhancement sheet is conformed to $0.1<A_1/P_1<0.9$ and $0.1<A_2/P_2<0.9$.

16. The liquid crystal display apparatus as claimed in claim 13, wherein widths of at least parts of the lenses in the first direction are not equal to each other.

17. The liquid crystal display apparatus as claimed in claim 16, a ratio of a maximum value among of the widths of the lenses in the first direction to a minimum value among of the widths of the lenses in the first direction is between 1 and 4.

18. The liquid crystal display apparatus as claimed in claim 16, wherein widths of at least parts of the lenses in the second direction are not equal to each other.

19. The liquid crystal display apparatus as claimed in claim 18, wherein a ratio value of a maximum value among of the widths of the lenses in the second direction to a minimum value among of the widths of the lenses in the second direction is between 1 and 4.

20. The liquid crystal display apparatus as claimed in claim 11, wherein at least one of the second surface, a surface of the reflective layer, and a surface of the diffusion layer facing away from the light-transmissive substrate is a rough surface.

* * * * *